United States Patent [19]

Ebert et al.

[11] Patent Number: 4,610,477
[45] Date of Patent: Sep. 9, 1986

[54] BRACKET FOR SUN VISOR FOR AUTOMOTIVE VEHICLES WITH MEANS FOR EXCLUDING MOLDING FOAM

[75] Inventors: Charles Ebert, Luxeuil, France; Lothar Viertel, Berus, Fed. Rep. of Germany; René Lecorvaisier, Hombourg-Haut, France; Joseph Menschaert, Haaltert, Belgium

[73] Assignee: Gebr. Happich GmbH, Fed. Rep. of Germany

[21] Appl. No.: 735,445

[22] Filed: May 17, 1985

[30] Foreign Application Priority Data

Nov. 9, 1984 [DE] Fed. Rep. of Germany ....... 3440976

[51] Int. Cl.[4] .............................................. B60J 3/02
[52] U.S. Cl. .................................... 296/97 K; 29/458; 264/138
[58] Field of Search ............. 296/97 K, 97 H; 29/458, 29/460; 264/138, 161, 46.4, 46.6, 250

[56] References Cited

U.S. PATENT DOCUMENTS

| 3,999,871 | 12/1976 | Palmer et al. | 296/97 K |
| 4,363,511 | 12/1982 | Viertel et al. | 296/97 K |
| 4,489,974 | 12/1984 | Warhol | 296/97 K |
| 4,533,275 | 8/1985 | Foggini | 296/97 K |

FOREIGN PATENT DOCUMENTS

| 61852 | 5/1975 | Australia | 296/97 K |
| 2234921 | 1/1974 | Fed. Rep. of Germany | 296/97 K |
| 3440976 | 4/1982 | Fed. Rep. of Germany | |
| 2431931 | 3/1980 | France | 296/97 K |
| 2445777 | 9/1980 | France | 296/97 K |

Primary Examiner—Robert R. Song
Attorney, Agent, or Firm—Ostrolenk, Faber, Gerb & Soffen

[57] ABSTRACT

A sun visor for automotive vehicles with one or more mounting brackets which are formed within the body of the sun visor. The sun visor is a molded foam body rigidified by a reinforcing insert. The mounting brackets for the visor are preferably formed by plastic injection molding, and the visor body is formed by foaming over the insert and the brackets. The mounting brackets each have at least one insertion opening which accommodates a respective mounting shaft or pin for connecting the sun visor to the body of the vehicle. To prevent foaming material from entering into a bracket insertion opening during the production of the sun visor, the mounting brackets are formed with an integral extension surrounding the area of the insertion opening. The integral extension protrudes out of the region of the sun visor body being foamed. After the foaming step in the manufacturing of the sun visor is completed, the integral extension is removed from the mounting bracket. Then the mounting shaft is inserted into the insertion opening. The integral extension can also serve as an anchor for clamping the bracket in place during the foaming of the sun visor body.

20 Claims, 6 Drawing Figures

BRACKET FOR SUN VISOR FOR AUTOMOTIVE VEHICLES WITH MEANS FOR EXCLUDING MOLDING FOAM

BACKGROUND OF THE INVENTION

The present invention relates to a sun visor for automotive vehicles and particularly to a foamed sun visor, and more particularly to the mounting bracket within the body of the sun visor. The bracket includes at least one insertion opening for accommodating a visor mounting or supporting shaft.

A conventional sun visor body is reinforced by an insert, in the form of a wire frame, which typically extends generally around the peripheral edges of the sun visor. Along one longitudinal edge of the sun visor one or more of the aforementioned brackets are provided for supporting the sun visor on the vehicle body. Typically, at one end region of the one longitudinal edge there is a first mounting bracket in which is defined an insertion opening for receiving therein one end of a mounting shaft. The other end of the mounting shaft is swivelably connected to the vehicle body. The first mounting bracket and its associated mounting shaft permits the sun visor to rotate and swivel in the familiar manner. Toward the opposite end of the one longitudinal edge, there is a second mounting bracket with two insertion openings which are adapted for receiving therein a mounting pin which is aligned approximately coaxially with the mounting shaft and which is parallel to the one longitudinal edge. The second mounting bracket extends across a cutout in the sun visor body. The mounting pin is detachably received in the mounting receiver of an outer support that is located on the vehicle body. The mounting brackets are clipped onto the wire frame or they may be formed directly on the wire frame, as by injection molding. Sun visors are available which have but one mounting bracket and one mounting shaft for effecting the interconnection between the sun visor and the vehicle body.

In conventional sun visor bodies, the unit comprising the wire frame and sun visor body are surrounded in a cushioning material, foam or the like, for defining the visor body which, in turn, is covered by a foil layer. Cut foam or molded foam can be used as the cushioning material. Cut foam includes pieces cut from webs of plastic foam which are placed on both sides of the reinforcing insert and of the mounting brackets and which are held together by the cover foil, having edges which are sealed together.

Molded foam sun visor bodies are formed by placing the reinforcing insert and the mounting brackets in a foaming mold and then foaming plastic material around them. The molded foam sun visor body is completed with the provision of a cover foil around it.

In producing foam molded sun visor bodies, major problems are encountered in the regions of the mounting brackets because it is difficult, due to the foaming pressure, to prevent foam from entering the shaft or pin insertion openings of the brackets. Although it is possible to employ adhesive tape, or the like, for covering the insertion openings, this is an unsatisfactory long-term solution since the adhesive tape method is time consuming and labor intensive and, in addition, is not particularly dependable.

SUMMARY OF THE INVENTION

It is an object of the present invention to provide an improved sun visor with a mounting bracket structure which avoids the problem of foam penetration into the shaft or pin insertion openings.

It is a further object of the invention to provide a sun visor body which is simple in construction and economical to produce.

A sun visor in accordance with the invention has at least one mounting bracket including an integral extension out of the bracket, which meets the edges of the shaft or pin insertion opening and which extends generally coaxially away from the respective insertion opening. The integral extension from the mounting bracket extends out of the sun visor body. The extension is formed so that it could be broken off the bracket or be cut away therefrom after molding of the sun visor body to thereafter allow the mounting shaft or mounting pin to be inserted into the respective insertion opening.

The bracket extension ensures that no foam material penetrates into the respective insertion opening during forming of the sun visor body. Secondly, the mounting bracket and the attached reinforcement insert can be clamped in a foaming mold by means of the integral extension. The extension, which protrudes out of the finished foamed article, can be easily grasped, separated from the mounting bracket, and possibly reused.

The integral extension is preferably in the form of a short tube. It may extend axially from the insertion opening. This enables the insertion opening and the bore of the short tube extension to be molded through use of the same follower of the injection molding machine.

In another preferred embodiment of the invention, the mounting bracket has two spaced apart arms with opposite, facing, respective insertion openings that hold a pin between them. The integral extension in this embodiment can extend between and connect the hole edges of the two opposite insertion openings to one another, and the integral extension is located between the two facing openings. The integral extension in this embodiment preferably has an inside diameter which corresponds to the diameter of the insertion openings. The above embodiment is particularly useful in the case of a mounting bracket which has two insertion openings to receive a mounting pin which extends in parallel to the longitudinal edge of the sun visor body, because this embodiment of an extension seals simultaneously the two facing insertion openings. In the production of a bracket having two insertion openings which are located, for example, on the arms of U-shaped bracket, one of the insertion openings can be produced as a blind hole while the second insertion opening is a through-hole, one end of which is closed by a plug, or the like. After the foaming process, the tubular extension can be removed by a snapping action or by employing a cutting device.

In another preferred embodiment of the invention, the integral extension can be provided with a region of intended breakage, e.g. a circumscribing region of lower thickness which defines a frangible region. In such case, the region can be in the form of an annular constriction which is located at the edges located between the mounting bracket and the integral extension. This embodiment allows the integral extension to be removed by breaking it off after it has fulfilled its intended purpose.

Other features and advantages of the present invention will be apparent from the following description of preferred embodiments and the accompanying drawings.

DETAILED DESCRIPTION OF THE PREFERRED EMBODIMENTS

Figure 1:
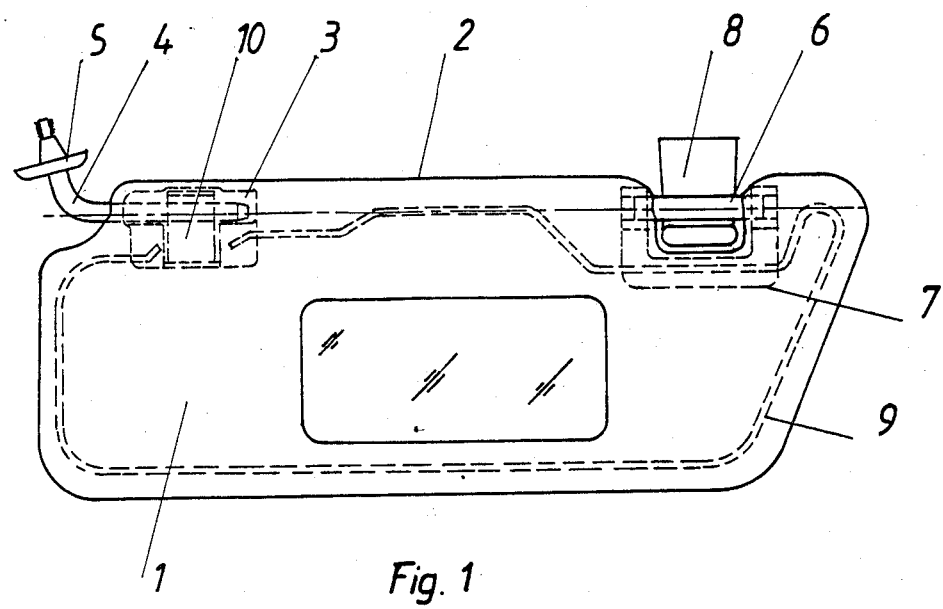
FIG. 1 is an elevational view of a complete sun visor including the swivelably mounted supporting shaft and the mounting pin.

Referring to FIG. 1, the sun visor there illustrated includes a sun visor body 1 having an upper longitudinal edge 2 with left and right end regions. On the left end region of the longitudinal edge 2, there is a swivel mount which includes a mounting bracket 3. An L-shaped sun visor shaft 4 includes one end which is inserted in the mounting bracket. A mounting housing 5 receives the other, short arm of the sun visor shaft 4 and fastens the shaft 4 to the body of the vehicle (not shown).

At the right end region of the longitudinal edge 2, there is an outer support mechanism for fastening the sun visor to the vehicle. The outer support mechanism comprises an outer support pin 6 and a mounting bracket 7 for the pin disposed to the visor body. The outer support pin 6 is detachably securable in the mounting receiver of an outer support housing 8 which is fastened to the body of the vehicle. The mounting brackets 3 and 7 are made part of the sun visor body 1 during the molding of the visor body. The brackets 3 and 7 are connected to a reinforcing insert 9 which stiffens the body of the sun visor. The reinforcing insert 9 may comprise a wire frame, or the like. The brackets 3 and 7 can be connected to the reinforcing insert 9 by means of respective clip attachments or they can be formed directly on the reinforcing insert 9 by injection molding. The mounting bracket 3 has disposed within it a spring 10 which radially clamps the long arm of the sun visor shaft 4.

Figure 3:
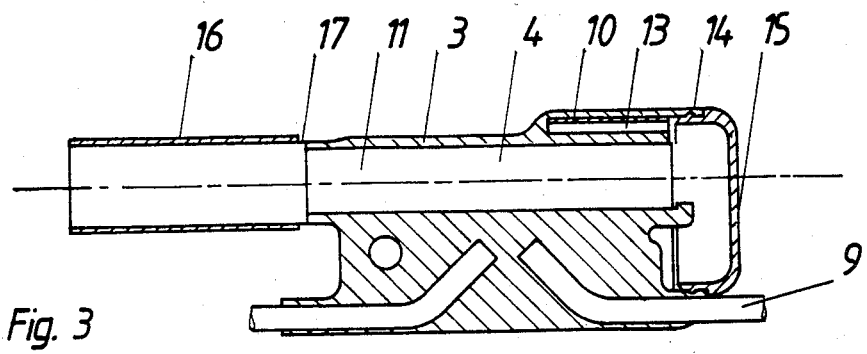
FIG. 3 is a section through the mounting bracket shown at the left in FIGS. 1 and 2.

FIG. 3 illustrates one preferred embodiment of the mounting bracket 3. It comprises a block-shaped plastic injection molded member which is fixedly connected to the wire frame reinforcement insert 9 by being directly injection molded onto it. The mounting bracket 3 is provided in its upper region with a continuous insertion opening 11. The longer arm of the sun visor shaft 4 is rotatably received within the insertion opening 11. A second insertion opening 13 is located in the rear end 12 of the mounting bracket 3. The insertion opening 13 is accessible only from the end 12. The mounting shaft is initially inserted through the end at the left in FIG. 3. A U-shaped spring 10 is provided in the opening 13. The spring clamps onto the shaft 4 and inhibits undesired up and down swinging of the visor body. The insertion opening 13 merges into the insertion opening 11 allowing the arms of the U-shaped spring 10 to penetrate into the insertion opening 11 and to radially clamp the sun visor shaft 4. A collar 14 protrudes from the rear end of the mounting bracket 3 and circumferentially surrounds the mounting bracket 3. The collar 14 is provided with a circumferential groove on its inner side. The collar 14 is enclosed by a cup-shaped cap 15. A circumscribing bead is formed on the external wall at the open side of the cup-shaped cap 15. The bead is inserted into and locked into the opening formed by the collar 14. In this manner, the rear end of the insertion opening 11 is closed and the spring 10 is also covered.

As shown in FIG. 3, the front or left end of the insertion opening 11 comprises or is extended by a tubular extension 16 which is integrally formed as part of the mounting bracket 3. The joint or transition region between the mounting bracket 3 and the extension 16 is defined by an annular constriction 17 or it may be a thin film which can be easily broken by application of a small force. Both the extension 16 and the cap 15 serve to prevent foam from penetrating inside the mounting bracket 3 during the foam molding of the sun visor. Moreover, the extension 16 can also be used to anchor the unit consisting of the mounting bracket 3, the mounting bracket 7, and the reinforcement insert 9 in the foaming mold by mere clamping of the extension 16. Following completion of the formation of the sun visor body 1, the extension 16 is broken off from the main body of the sun visor to expose the insertion opening 11 and make it accessible to the shaft 4.

Figure 4:
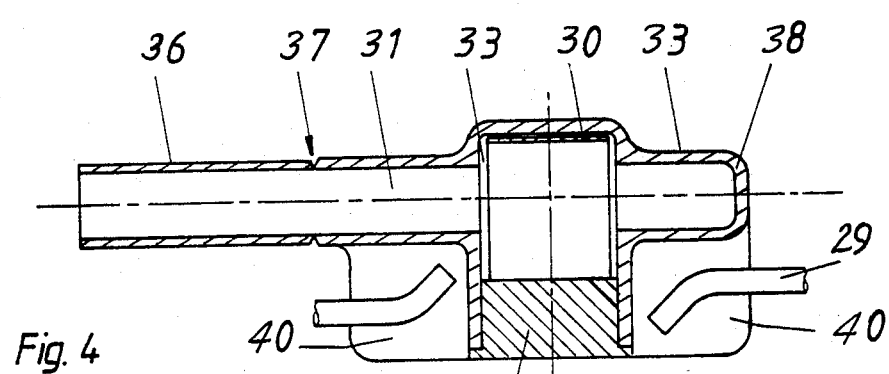
FIG. 4 is a section through a second embodiment of the mounting bracket shown in FIG. 3.

An alternate embodiment of the mounting bracket 37 is shown in FIG. 4. In this embodiment, the mounting bracket 37 is formed so that the insertion opening 31 is enclosed at one end 38 thereof by an integral cap. The spring 30 is seated in a socket 39 inside the bracket. The combination of the spring 30 and the socket 39 is located in an insertion opening 33 which extends perpendicularly to the axial direction of the insertion opening 31 of the sun visor shaft 4. The mounting bracket 37 of FIG. 4 also includes clip receivers 40 for receiving the reinforcement insert 29 and may include any suitable structure for carrying out the aforesaid purpose. As in the embodiment of FIG. 3, an integral tubular extension 36 extends from the mounting bracket 37 at the insertion opening 31, and that extension has the same form as the similar extension in FIG. 3. There is also a similar construction 37.

Figure 2:
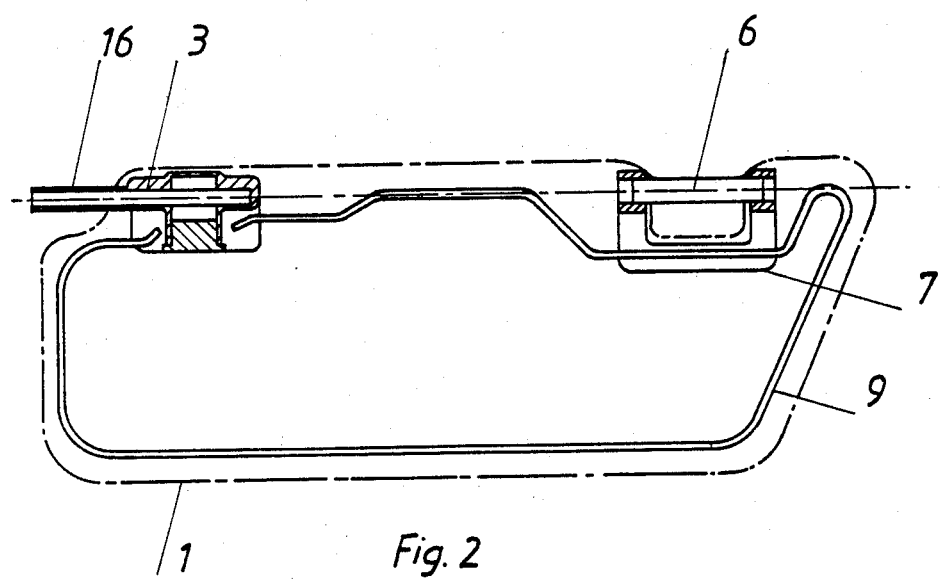
FIG. 2 shows the stiffening or reinforcing insert for and the mounting brackets of the sun visor of FIG. 1, with the extensions of the invention in place.
Figure 5:
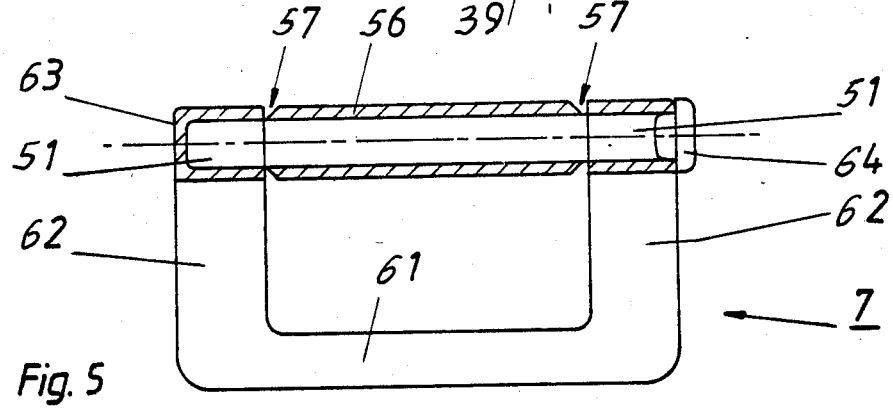
FIG. 5 is a section through the mounting bracket which is shown at the right in FIGS. 1 and 2.
Figure 6:
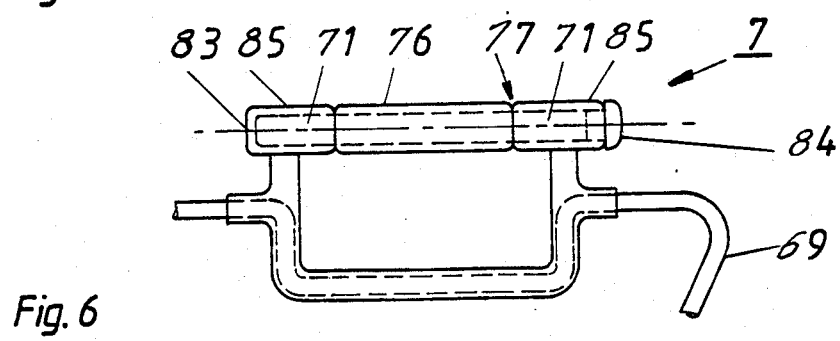
FIG. 6 shows a second embodiment of the mounting bracket shown in FIG. 5.

FIGS. 5 and 6 illustrate preferred embodiments of the mounting bracket 7 which is shown at the right in FIGS. 1 and 2. As shown in FIG. 5, the mounting bracket 7 is U-shaped, including a web or base 61 and a pair of upstanding arms 62. The upper end regions of the arms are provided with opposite, facing insertion openings for receiving an outer-support pin 6 (shown in FIG. 2). Foam material cannot enter the openings which are defined in the arms 62 because an integral extension 56, of tubular shape, is formed between the arms 62 and around the openings to protect the peripheral edges of the holes in the arms 62 which face one another.

The opening 51 on the left is enclosed by the permanent bottom end 63, which forms part of the arm 62, and the opening on the right side edge of the insertion opening 51 is covered by a plug 64. In this form, with the integral extension 56 as part of the bracket, the foaming process is carried out with assurance that foaming material cannot enter the insertion opening 51. Upon completion of the foaming, the extension 56 is removed either by breaking or cutting it off from the bracket 7 at 57. Thereafter, the sun visor body 1 is completed by enclosing the foam body in a cover foil and by then inserting the outer-support shaft 6 into the insertion opening 51. This subsequent insertion of the shaft 6 creates a particularly clean closure between the outer-support shaft 6 and the cover foil.

In another embodiment illustrated in FIG. 6, the mounting bracket 7 is formed by injection molding directly on the reinforcement insert 69. Here the insertion opening 71 is defined in mounting lugs 85 at the ends of the arms of the bracket, and the integral tubular extension 76 is formed between the mounting lugs 85 in the manner as described with reference to the embodiment of FIG. 5. Also, the ends of the lugs 85 are closed off, with the one on the left having a permanent bottom end and the other opening being closed by a plug 84. Preferably, the insertion openings 71 and the extension 76 have similar inner diameters.

Although the present invention has been described with reference to specific embodiments thereof, many variations and modifications will now become apparent to those skilled in the art. It is preferred, therefore, that the present invention be limited not by the specific disclosure herein, but only by the claims which follow.

What is claimed is:

1. A sun visor for automotive vehicles, comprising:
  a sun visor body;
  a mounting bracket attached to the sun visor body, the mounting bracket defining an insertion opening for supporting a shaft therein; and
  an extension which is integral with and extends from the mounting bracket at a region thereof which defines one end of the insertion opening and the extension surrounding the periphery of the opening, the integral extension protruding out of the sun visor body, whereby the insertion opening is effectively covered against entry of material by the extension; the extension being separable from the mounting bracket.

2. A sun visor as in claim 1 in which the integral extension extends along the axial direction of the insertion opening.

3. A sun visor as in claim 1 in which the integral extension is formed in the shape of a short tube which opens into the insertion opening.

4. A sun visor as in claim 1 in which the integral extension extends along an axial direction associated with the insertion opening.

5. A sun visor as in claim 2 in which the integral extension has an inside diameter approximately equal to the inside diameter of the insertion opening.

6. A sun visor as in claim 1, wherein the visor body is surrounded and defined by its peripheral edges and the mounting bracket is at one of the peripheral edges.

7. A sun visor as in claim 1, wherein the sun visor is rotatable about the shaft.

8. A sun visor as in claim 1, wherein the bracket is within the visor body.

9. A sun visor as in claim 1, wherein the visor body is a foam molded plastic body.

10. A sun visor as in claim 9, wherein the mounting bracket is an injection molded plastic piece.

11. A sun visor as in claim 1, wherein the extension is separable from the mounting bracket at a region between the integral extension and the mounting bracket which is frangible for facilitating the separation of the integral extension from the mounting bracket.

12. A sun visor as in claim 11 in which the frangible region comprises an annular constriction located at the integral extension near the insertion opening.

13. A sun visor as in claim 6, further comprising:
  a second mounting bracket located on the sun visor body, along the one peripheral edge, the second mounting bracket defining first and second opposite openings which face one another, the first and second openings being adapted for receiving a mounting pin extending into and between them; and a second extension formed integrally with the additional mounting bracket and extending between the first and second openings for preventing entry of material into the first and second openings; the extension being separably connected to the mounting bracket around the openings and the extension being separable from the bracket.

14. A sun visor as in claim 13 in which the second integral extension has an inside diameter which equals the inside diameter of the first and second openings.

15. A sun visor as in claim 13, wherein the separable connection of the extension to the additional mounting bracket comprises frangible regions formed between the second extension and the additional mounting bracket at the first and second openings for defining breakage lines between the second extension and the additional mounting bracket at the first and second openings.

16. A sun visor as in claim 10 in which the frangible regions are comprised of annular constrictions located between the second integral extension and the openings.

17. A sun visor as in claim 13 in which the second integral extension is formed in the shape of a tube.

18. A method for producing a sun visor for automotive vehicles, comprising:
  molding a mounting bracket with an insertion opening therein, the insertion opening having a size and shape for a shaft;
  forming an integral extension on the bracket around the insertion opening and extending away from the opening, and forming a separation region which permits the ready separation of the integral extension from the mounting bracket generally at the insertion opening;
  placing the mounting bracket in a predefined orientation in a foaming mold for forming the sun visor body;
  foam molding the sun visor body and the mounting bracket, while at least a portion of the integral extension remains exposed; and
  separating the integral extension from the mounting bracket to permit access to the insertion opening.

19. A method of claim 18, wherein after separating the extension from the bracket, inserting a shaft from outside the body into the insertion opening.

20. A method of claim 18 in which the one mounting bracket is formed on the sun visor body by plastic injection molding.

* * * * *